US012806863B2

(12) United States Patent
Fox et al.

(10) Patent No.: US 12,806,863 B2
(45) Date of Patent: Nov. 24, 2026

(54) METHOD AND SYSTEM FOR RUNTIME CORRECTION OF DEFECTS WITH 3D PRINTED OBJECT WITH PROACTIVE PREPARATION

(71) Applicant: International Business Machines Corporation, Armonk, NY (US)

(72) Inventors: Jeremy R. Fox, Georgetown, TX (US); Jill S. Dhillon, Jupiter, FL (US); Tushar Agrawal, West Fargo, ND (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 436 days.

(21) Appl. No.: 18/305,161

(22) Filed: Apr. 21, 2023

(65) Prior Publication Data

US 2024/0351288 A1 Oct. 24, 2024

(51) Int. Cl.
*B29C 64/393* (2017.01)
*B33Y 50/02* (2015.01)

(52) U.S. Cl.
CPC ............. *B29C 64/393* (2017.08); *B33Y 50/02* (2014.12)

(58) Field of Classification Search
CPC .............................. B29C 64/393; B33Y 50/02
See application file for complete search history.

(56) References Cited

U.S. PATENT DOCUMENTS

| | | | | |
|---|---|---|---|---|
| 9,724,876 | B2 | 8/2017 | Cheverton et al. | |
| 9,747,394 | B2 | 8/2017 | Nelaturi et al. | |
| 9,937,666 | B2 | 4/2018 | Hadas | |
| 10,295,502 | B2 | 5/2019 | Clavette et al. | |
| 10,421,267 | B2 * | 9/2019 | Reese ................ | G05B 19/4099 |
| 11,472,102 | B2 | 10/2022 | Lewis et al. | |

(Continued)

FOREIGN PATENT DOCUMENTS

| | | | | |
|---|---|---|---|---|
| CN | 104552946 B | | 9/2016 | |
| CN | 111046597 A | * | 4/2020 | ........... B29C 64/386 |
| CN | 115489125 A | * | 12/2022 | ........... B29C 64/386 |

OTHER PUBLICATIONS

Sujit Rokka Chhetri et al., “QUILT: Quality Inference from Living Digital Twins in IoT-Enabled Manufacturing Systems,” Association for Computing Machinery, Year: 2019, pp. 237-248.

(Continued)

*Primary Examiner* — Chad G Erdman
(74) *Attorney, Agent, or Firm* — Kelsey M. Skodje, Esq.; Kevin P. Radigan, Esq.; Heslin Rothenberg Farley & Mesiti P.C.

(57) ABSTRACT

Embodiments herein describe monitoring the progress of a 3D printing job using a digital twin which can provide corrective actions in real time. The quality of a 3D printed object is dependent on the conditions of different components of the 3D printers such as a heating module, a nozzle, and the level of vibration in different parts, etc. To detect problematic conditions that may negatively impact the 3D printing job, a digital twin simulation of the 3D printer can detect or predict what types of defects have (or will) happen as the object is printed. That way, a corrective action can be taken while the object is printed to either prevent a defect or correct a defect in the 3D object.

20 Claims, 4 Drawing Sheets

(56) References Cited

U.S. PATENT DOCUMENTS

| | | | | |
|---|---|---|---|---|
| 2016/0325498 | A1 | 11/2016 | Gelbart | |
| 2017/0144250 | A1 | 5/2017 | Gold et al. | |
| 2018/0126620 | A1 | 5/2018 | Talgorn et al. | |
| 2019/0210290 | A1 * | 7/2019 | Vierling | B29C 64/393 |
| 2021/0114293 | A1 | 4/2021 | Kim et al. | |
| 2022/0197306 | A1 * | 6/2022 | Cella | B33Y 50/02 |
| 2022/0379381 | A1 * | 12/2022 | Buller | B29C 64/386 |
| 2024/0017325 | A1 * | 1/2024 | Taverniers | B22F 10/38 |
| 2024/0208228 | A1 * | 6/2024 | Cessel | B41J 2/16535 |

OTHER PUBLICATIONS

Christopher M. Henson et al., "A digital twin strategy for major failure detection in fused deposition modeling processes," Elsevier, ScienceDirect Procedia Manufacturing 53, Year: 2021, pp. 359-367.

Gabriel Avelino R. Sampedro et al., "Exploring Machine Learning-Based Fault Monitoring for Polymer-Based Additive Manufacturing: Challenges and Opportunites," Sensors, Dated: Dec 2, 2022, pp. 1-14.

Sujit Rokka Chhetri et al., "Digital Twin of Manufacturing Systems," CECS: Center for Embedded & Cyber-Physical Systems, CECS Technical Report CECS TR#17-07 Dated: Nov. 27, 2017, pp. 1-20.

Antreas Kantaros et al., "3D Printing and Implementation of Digital Twins: Current Trends and Limitations," Appl. Syst. Innov., Dated: Dec. 30, 2021, pp. 1-10.

Roberto Milton Scheffel et al., "Automated Fault Detection for Additive Manufacturing using Vibration Sensors," International Journal of Computer Integrated Manufacturing, Dated: Mar. 22, 2021, pp. 500-514.

"Latest Release of IBM iConnect Access® Provides Foundation for Planned Future 3D Printing Solution," IBM, Dated: May 24, 2021, pp. 1-2.

Steve Peterson et al., "Shifting transport paradigms: Understanding the Implications of 3D printing on the global transporation industry," IBM Institute for Business Value, Year: 2014, Date Accessed: Apr. 17, 2023, pp. 1-16.

"3D Printing Market Size, Share & Industry Growth Analysis Report by Offering (Printer, Material, Software, Services), Process (Binder Jetting, Direct Energy Deposition, Material Extrusion, Material Jetting, Powder Bed Fusion), Application, Vertical, Technology and Region—Global Growth Driver and Industry Forecase to 2028," MarketsAndMarkets, Published: Apr. 2023, pp. 1-13.

* cited by examiner

METHOD AND SYSTEM FOR RUNTIME CORRECTION OF DEFECTS WITH 3D PRINTED OBJECT WITH PROACTIVE PREPARATION

BACKGROUND

The present invention relates to three dimensional (3D) printing, and more specifically, to using digital twins to improve 3D printing in real time.

3D printing (or additive manufacturing) is a process of making 3D solid objects from a digital file. The creation of a 3D printed object is achieved using additive processes. In additive processes, an object is created by laying down successive layers of material until the object is created. Each of these layers is a thinly sliced cross-section of the object. 3D printing is the opposite of subtractive manufacturing which is cutting out or hollowing a piece of a material with, e.g., a milling machine. 3D printing enables the production of complex shapes using less material than traditional manufacturing methods.

3D printing is used for manufacturing 3D objects and can also be used for repairing 3D objects. There are various 3D printing systems, where the 3D printing systems can leverage and use the capabilities of robotic systems, perform self-mobility with swarm 3D printing robots, and perform printing in a collaborative manner.

SUMMARY

According to one embodiment of the present invention, a method includes receiving input from a 3D printing environment including a 3D printer currently printing a 3D object, generating a digital twin of the 3D printer based on the input, analyzing the digital twin to identify a condition that can generate a defect in the 3D object, and determining, in real time, a corrective action to be performed in the 3D printing environment to correct the condition before the 3D printer has finished printing the 3D object.

According to one embodiment of the present invention, a system includes a processor and memory which includes computer code which, when executed by the processor, performs an operation. The operation includes receiving input from a 3D printing environment including a 3D printer currently printing a 3D object, generating a digital twin of the 3D printer based on the input, analyzing the digital twin to identify a condition that can generate a defect in the 3D object, and determining, in real time, a corrective action to be performed in the 3D printing environment to correct the condition before the 3D printer has finished printing the 3D object.

According to one embodiment of the present invention, a computer program product comprising a computer readable storage medium having computer readable program code embodied therewith, the computer-readable program code executable by one or more computer processors to perform an operation. The operation includes receiving input from a 3D printing environment including a 3D printer currently printing a 3D object, generating a digital twin of the 3D printer based on the input, analyzing the digital twin to identify a condition that can generate a defect in the 3D object, and determining, in real time, a corrective action to be performed in the 3D printing environment to correct the condition before the 3D printer has finished printing the 3D object.

DETAILED DESCRIPTION

Figure 1:
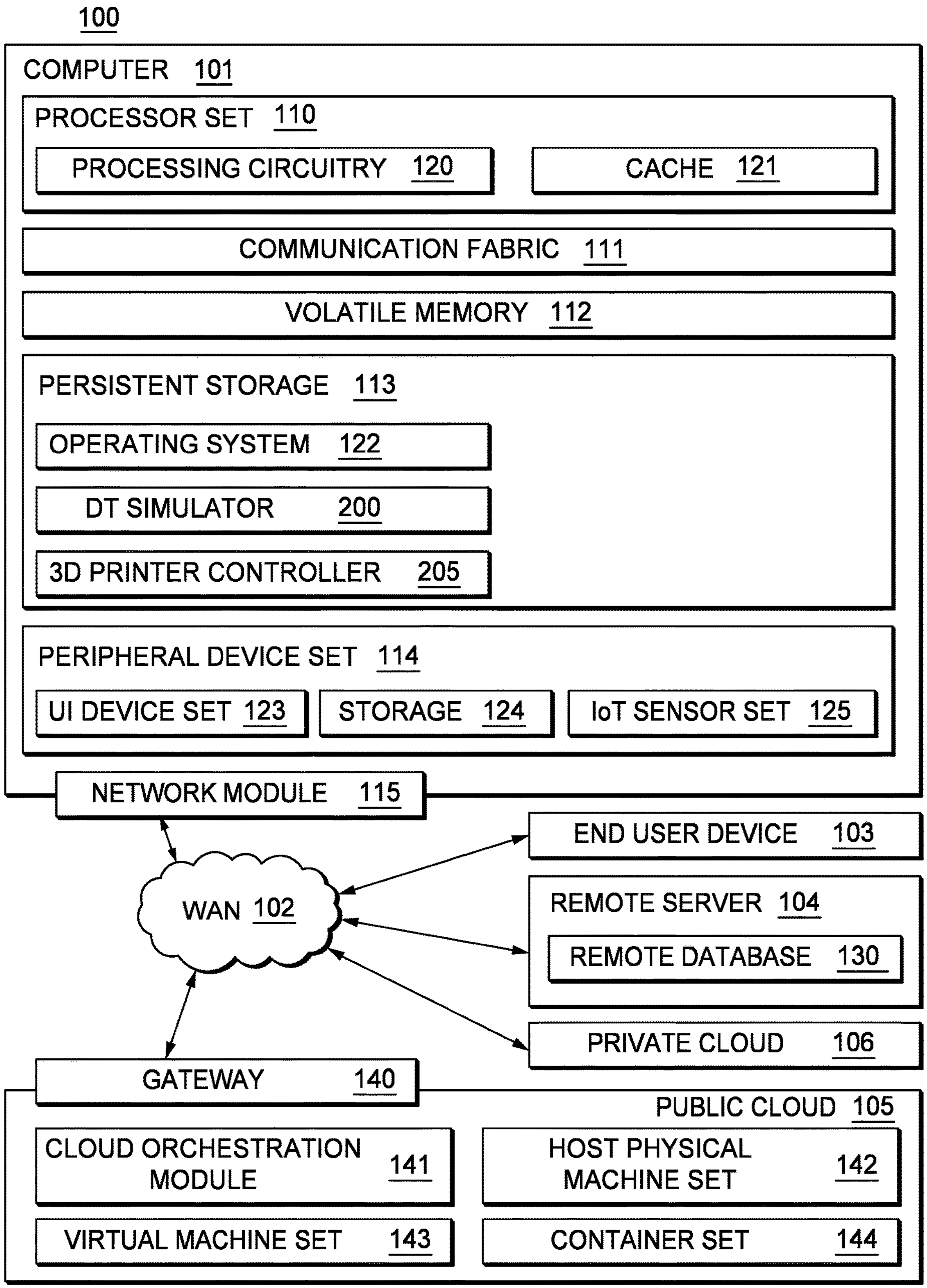
FIG. 1 is a block diagram of an example computer environment for use in conjunction with one or more disclosed embodiments.

Embodiments herein describe monitoring the progress of a 3D printing job using a digital twin which can provide corrective actions in real time. The quality of a 3D printed object is dependent on the conditions of different components of the 3D printers such as a heating module, a nozzle, the level of vibration in different parts, etc. To detect problematic conditions that may negatively impact the 3D printing job, a digital twin simulation of the 3D printer can detect or predict what types of defects have (or will) happened as the object is printed. That way, a corrective action can be taken while the object is printed in real time. The corrective action can either prevent the defect from arising in the 3D object, or fix a defect that is already in the 3D object.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as digital twin (DT) simulator 200 and 3D printer controller 205. As discussed in more detail below, the DT simulator 200 can simulate the environment of the 3D printer and then provide suggested actions, in real time, to the 3D printer controller 205 for correcting current problems or potential future problems. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
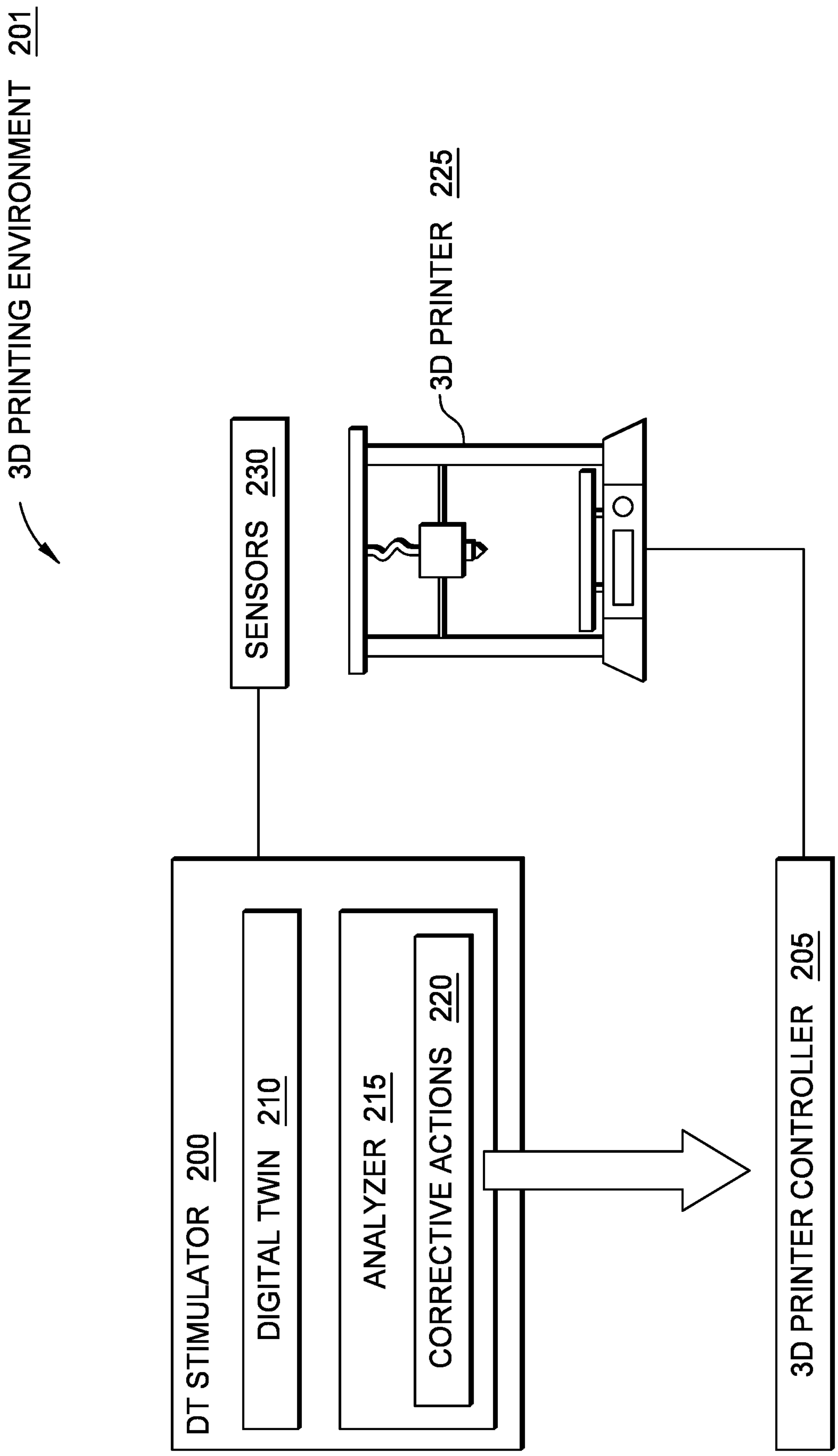
FIG. 2 illustrates a 3D printing environment, according to one embodiment.

FIG. 2 illustrates a 3D printing environment 201, according to one embodiment. The environment 201 includes a 3D printer 225 which is used to print 3D objects. The 3D printer 225 is not limited to any particular type or structure. That is, the control embodiments described herein can be applied to a variety of different types and arrangements of 3D printers. Further, the embodiments herein can also apply to additive manufacturing, which is described as being synonymous with 3D printing. In one embodiment, the 3D printer 225 prints a 3D object by joining material layer by layer using a computer file (e.g., a computer-aided design (CAD) file).

The 3D printer 225 may include at least one nozzle for applying the 3D printing material, but can include any number of nozzles (e.g., a swarm of 3D printing robots). In one embodiment, the 3D printer 225 may include a primary nozzle (or multiple primary nozzles) that is tasked with printing the 3D object based on the file and a secondary nozzle (or multiple secondary nozzles) that are used to perform a corrective action generated by the DT simulator 200. As will be discussed in more detail below, due to problematic conditions in the environment 201 such as a vibrations, a faulty part, poor heating, humidity, etc., a defect may be introduced (or may be introduced in the future) in the 3D object. While the primary nozzle is generating a layer in the 3D object, the secondary nozzle can correct a defect in the same layer or a different layer in the 3D object. As such, the primary and secondary nozzles can operate in parallel. However, in other embodiments, the 3D printer 225 may not have a separate, secondary nozzle for correcting for defects, but can use the primary nozzle to correct any defects.

In addition to the 3D printer 225, the environment 201 includes one or more sensors 230 for capturing information regarding the environment 201. The sensors 230 may be disposed within the 3D printer 225 and external to the printer. The sensors 230 can measure vibration in the environment 201, performance of parts in the 3D printer 225 (e.g., whether a part is failing), environmental conditions (e.g., humidity, heat, etc.), capture images of the 3D object, and the like.

As shown, the sensors 230 are coupled to the DT simulator 200 to provide information captured by the sensors 230 regarding the 3D printing environment 201 to the DT simulator 200. Using the sensor output, the DT simulator 200 (e.g., a software application) generates a DT 210 of the 3D printer 225. In one embodiment, the DT 210 is a digital replica of an object in the physical world (e.g., the 3D printer 225 and the 3D object). In one embodiment, the DT simulator 200 is a computer program that uses real world data captured by the sensors 230 to create simulations (e.g., the DT 210) that can predict how the 3D printer 225 will perform. The DT 210 can then be used to determine what defects have already been introduced into the 3D object, or predict what defects might be introduced in the future.

The DT simulator 200 includes an analyzer 215 that analyzes the DT 210 to determine a corrective action 220. For example, the DT 210 may indicate that the 3D printer 225 is experiencing vibrations which may cause a defect in the 3D object. The analyzer 215 can then generate a corrective action 220 that prevents the defect from ever occurring, or a corrective action 220 that corrects the defect. In either case, in one embodiment, the corrective action 220 is performed while the 3D printer 225 is currently creating the 3D object. That is, in contrast to other DT solutions, the embodiments herein include techniques for generating corrective actions 220 in real time that can be applied while the 3D printer 225 is currently generating the 3D object. Thus, rather than only providing feedback after a task is complete, the DT simulator 200 can provide real-time corrective actions 220 for the current 3D object being printed.

FIG. 2 illustrates the analyzer 215 transmitting the corrective actions 220 to the 3D printer controller 205. In one embodiment, the controller 205 is a software application or firmware that controls the 3D printer 225. The 3D printer controller 205 can instruct the 3D printer 225 to perform the corrective actions 220. In this manner, the 3D printer controller 205 can prevent or correct defects on the fly using the DT 210.

In one embodiment, the 3D printing environment 201 can operate without user input. That is, the DT simulator 200 and the 3D printer controller 205 can operate autonomously to identify potential or actual defects using the DT 210 and then perform a corrective action to prevent or remedy the defect.

In another embodiment, the 3D printing environment 201 receives input from a user. For example, while the DT simulator 200 can generate the corrective action 220 in real-time, the 3D printer controller 205 may wait for user permission before it performs the corrective action 220. For example, the 3D printer controller 205 may output a prompt to an input/output device (e.g., a computer screen, mobile phone, tablet, etc.) indicating the corrective action 220 and asking whether the user would like the 3D printer controller 205 to perform the corrective action 220 in order to prevent or remedy a defect in the 3D object that is currently being printed. The user can then approve or disapprove the corrective action 220. For example, the user may decide the defect is minor enough that it does not need to be corrected, or that the part is not important enough to perform the corrective action. In that case, the user may disapprove the corrective action.

In another example, the analyzer 215 may determine multiple, alternative corrective actions that can be performed to correct or prevent a defect. The user may then select which of the multiple corrective actions the 3D printer controller 205 should perform.

In one embodiment, the proposed system may consider several parameters (delivery date, whether the part being printed is to be used in another object, if the part can still be used if the defect is not corrected, etc.) to identify a priority to use to initiate 3D printing correction process once a potential defect has been identified. If the 3D object does not have sufficient priority, then the corrective action may not be performed. For example, if the part has to be thrown away if the corrective action is not performed, then the priority may be high and the action is performed. However, if the part can still be sold (perhaps at a lower price), then the corrective action may not be performed. Multiple factors can be used to assign a priority to the 3D object which then determines whether the corrective action is performed.

Figure 3:
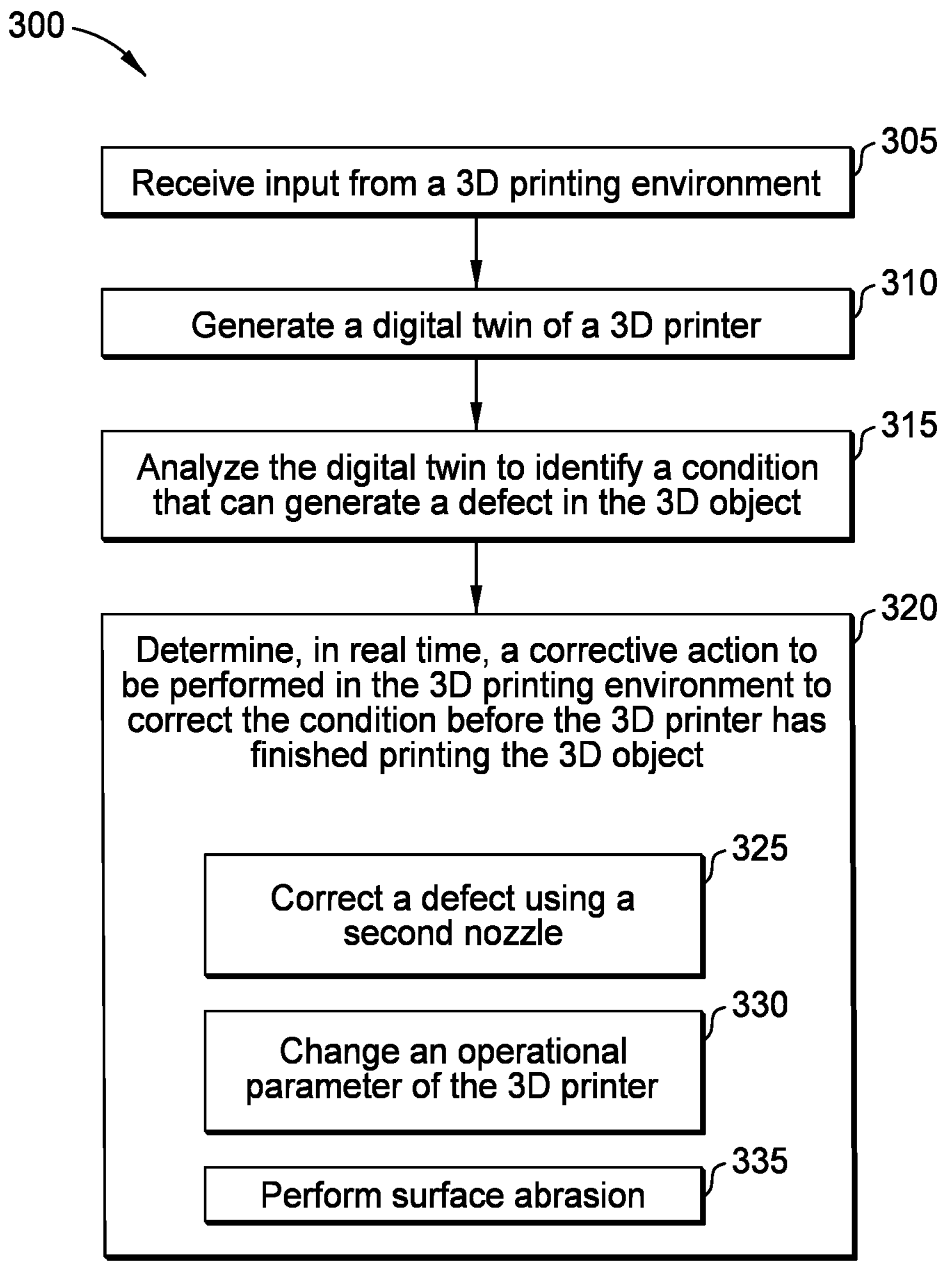
FIG. 3 is a flowchart for using a digital twin to determine corrective actions during a 3D printing job, according to one embodiment.

FIG. 3 is a flowchart of a method 300 for using a DT to determine corrective actions during a 3D printing job, according to one embodiment. At block 305, the DT simulator (e.g., the DT simulator 200 in FIGS. 1 and 2) receives input from a 3D printing environment. In one embodiment, the input is received from sensors that are disposed on or around a 3D printer. The sensors can measure vibrations in the 3D printing environment, performance of parts in the 3D printer (e.g., whether a part is failing), environmental conditions (e.g., humidity, heat, etc.), or capture images of the 3D object currently being printed. For example, the sensors may be current sensors, motion detectors, cameras, temperature gauges, and the like.

At block 310, the DT simulator generates a DT of the 3D printer using the input received at block 305. In one embodiment, the DT simulator performs DT simulation based on baseline data for the 3D printer, plus historically collected data from various types of parts and runtime problems experienced with the 3D printer, on the surface on which the printer is mounted, or on the object being printed. This may include any detected vibration on the surface where the 3D printer is mounted (or on any portion of the 3D printer), any identified jamming of parts during printing, or problem with the nozzle, heating system in the 3D printer, and the like.

In one embodiment, the DT may include only the 3D printer. In other embodiments, the DT may include the 3D printer as well as the environment around the 3D printer (e.g., the surface or structure on which the 3D printer is mounted). In yet another embodiment, the DT may be limited to a set number of components in the 3D printer (but not all the components). For example, the DT simulation may be performed only on components in the 3D printer that have a history of failing or causing defects, while the components in the 3D printer that rarely (or never) cause defects may be excluded from the DT simulation in order to preserve compute resources and improve the response time of the DT simulator.

At block 315, an analyzer (e.g., the analyzer 215 in FIG. 2) analyzes the DT to identify a condition that can generate a defect in the 3D object. That is, by generating the DT (i.e., by performing DT simulation), the analyzer can predict future conditions, current conditions, or past conditions that can create a defect in the 3D object. For example, based on the DT, the analyzer may predict that a nozzle will soon (or already has) malfunctioned or that a part will soon jam. Or the analyzer may predict, based on a current temperature, that 3D object is likely to have a defect. In another example, the analyzer may predict that sensed vibrations may cause (or have caused) a defect in the 3D object.

At block 320, the analyzer determines, in real time, a corrective action to be performed in the 3D printing environment to correct the condition before the 3D printer has finished printing the 3D object. In one embodiment, the corrective action may prevent the defect from ever occurring in the 3D object. For example, the corrective action may be replacing a part that is about to fail, or increasing a heat setting on the 3D printer to compensate for a detected decrease in temperature that may result in a defect. In other embodiments, the corrective action remedies (e.g., fixes or mitigates) a defect that has already occurred in the 3D object.

The sub-blocks 325-335 discuss various corrective actions that can be performed at run time to prevent or correct defects. At block 325, the 3D printer controller can correct a defect using a second nozzle. That is, block 325 assumes that the DT simulation detects a defect that has already occurred in the 3D object and uses a second nozzle (e.g., a secondary nozzle) to fix the defect. For example, the DT simulation may have determined that a condition identified at block 315 resulted in a defect in one of the layers. As an example, environmental vibrations (e.g., the 3D printer was bumped) may have resulted in a layer having a non-planar surface. The 3D printer controller can use the second nozzle to change the non-planer surface into a planar surface. Advantageously, this can occur at the same time the first nozzle (e.g., the primary nozzle) continues to form another layer of the 3D object. That is, the second nozzle can operate to correct a defect in parallel with the first nozzle continuing to print the 3D object.

In another example of a corrective action, at block 330, the 3D printer controller changes an operational parameter of the 3D printer. For example, to prevent a defect, the controller may change a heat setting to increase or decrease the heat generated by a heating element in the 3D printer. Or the controller may increase the power or current being delivered to a component in the 3D printer to prevent the component from malfunctioning. In another example, the controller may instruct a component to perform a self-cleaning cycle to prevent a defect. Thus, block 330 can be one example of a corrective action that prevents defects.

In another example, if a vibration is detected in the environment by the DT, the corrective action can include synchronizing the printing nozzle with the vibration amplitude to prevent the vibration from causing a defect. That is, the controller may introduce a vibration in the nozzle that is similar in magnitude but opposite in phase from the environmental vibration so that the vibrations cancel out.

In another example, to prevent a defect, the controller may replace or switch out faulty parts or perform preventive maintenance on a part, although this may require human intervention. Alternatively, the 3D printer may have redundant components (e.g., multiple primary nozzles) which the 3D printer controller can switch between when one of the components is predicted to fail by the DT. In that case, the corrective action could be performed without human intervention.

In another example of a corrective action, at block 335, the 3D printer controller performs a surface abrasion on the 3D object. For example, the defect may be a protrusion or a spillage that deposits excess material on the 3D object. In this case, the 3D printer controller may instruct a component on the 3D printer to remove the excess material. In one embodiment, this can be performed while the primary nozzle continues to print the 3D object.

In sum, the method 300 can use DT simulation to identify conditions that can generate defects in the 3D print job. The method 300 can also generate, in real time, corrective actions to prevent or remedy these defects. While multiple different types of corrective actions have been discussed, the embodiments herein are not limited to the ones mentioned and other types of corrective actions are contemplated.

Figure 4:
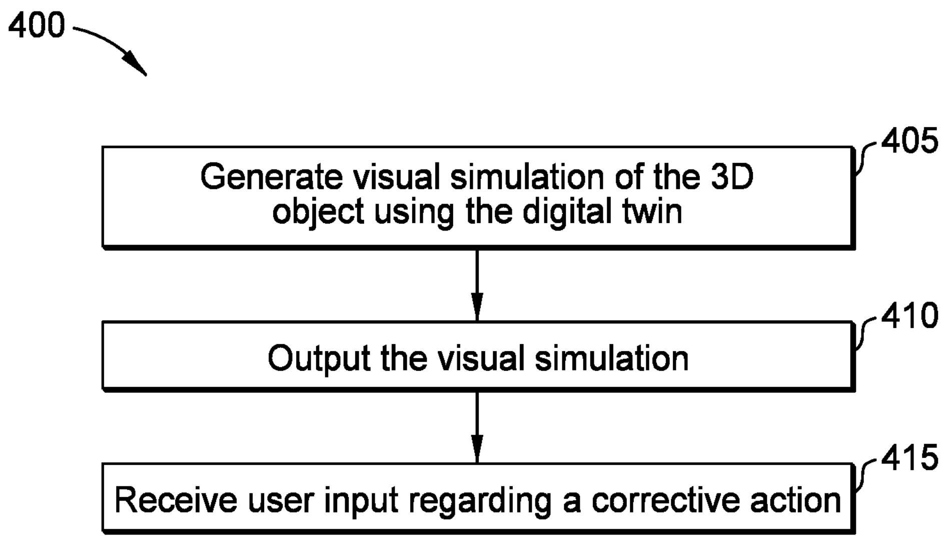
FIG. 4 is a flowchart for displaying information using a digital twin, according to one embodiment.

FIG. 4 is a flowchart of a method 400 for displaying information using a DT, according to one embodiment. At block 405, the DT simulator generates a visual simulation of the 3D object using the DT. The visual simulation can include a 3D drawing or rendering of the DT. At block 410, the DT simulator outputs the visual simulation. In one embodiment, the DT simulator transmits the visual simulation to an input/output device such as a computer with a display, a tablet, and the like.

A user (e.g., an administrator) can view the visual simulation to determine whether to perform a corrective action. For example, the visual simulation may indicate that a component in the 3D printer is behaving erratically. Or the visual simulation may indicate that the 3D object has a defect. In one embodiment, the user can manipulate the visual simulation such as changing views of the printing environment, zooming in on a particular component in the visual simulation, look inside the 3D object, and the like. In one embodiment, the user can visualize using Augmented Reality what types of defects can happen on the 3D printed object.

In one embodiment, the visual simulation is shown on a 3D interactive dashboard (e.g. visual defects or vibrational defects), so that the user can address what types of defects are happening based on the DT simulation to, or on, the layers of the 3D printed object.

At block 415, the 3D printer controller receives user input regarding a corrective action. In one embodiment, the user approves a corrective action suggested by the DT simulator (e.g., by the analyzer in the DT simulator). In another embodiment, the user provides the controller with a corrective action (which was not suggested by the DT simulator). In yet another example, the user may instruct the 3D printer controller to perform multiple corrective actions. The corrective actions may be corrective actions suggested by the DT simulator, corrective actions provided by the user, or a combination of both. In this manner, the method 400 can provide a visual simulation to the user to help the user decide what corrective actions should be taken.

While the foregoing is directed to embodiments of the present invention, other and further embodiments of the invention may be devised without departing from the basic scope thereof, and the scope thereof is determined by the claims that follow.

What is claimed is:

1. A method comprising:

receiving input from a 3D printing environment comprising a 3D printer currently printing a 3D object;

generating a digital twin of the 3D printer based on the input, wherein the digital twin digitally represents one or more physical components of the 3D printer during printing of the 3D object;

analyzing the digital twin to identify a condition of at least one component of the one or more physical components of the 3D printer that can generate a defect in the 3D object being currently printed by the 3D printer; and determining, in real time, a corrective action to be performed in the 3D printing environment to correct the condition during a same print job in which the 3D object is being currently printed and before the 3D printer has finished printing the 3D object, wherein the corrective action comprises an action to correct the defect while a primary nozzle of the 3D printer continues to print the 3D object.

2. The method of claim 1, wherein generating the digital twin of the 3D printer is based on historically collected data from different types of parts and runtime problems experienced with the 3D printer.

3. The method of claim 1, wherein determining the corrective action to correct the condition is performed before the condition has caused a defect in the 3D object.

4. The method of claim 3, wherein the corrective action comprises:

changing an operational parameter of the at least one component of the one or more physical components of the 3D printer before the defect has occurred.

5. The method of claim 3, wherein the corrective action comprises:

performing preventive maintenance on the at least one component of the one or more physical components of the 3D printer before the defect has occurred.

6. The method of claim 1, wherein determining the corrective action to correct the condition is performed after the condition has caused a defect in the 3D object.

7. The method of claim 6, wherein the corrective action comprises:

controlling a secondary print nozzle in the 3D printer to correct the defect in the 3D object being printed while the primary nozzle in the 3D printer continues to print the 3D object.

8. The method of claim 6, wherein the corrective action comprises:

performing a surface abrasion on the 3D object to correct the defect while the primary nozzle in the 3D printer continues to print the 3D object.

9. The method of claim 1, further comprising:

generating a visual simulation of the 3D object using the digital twin;

outputting the visual simulation; and receiving user input regarding the corrective action.

10. A system, comprising:

a processor; and memory, wherein the memory includes computer code which, when executed by the processor, performs operations comprising:

receiving input from a 3D printing environment comprising a 3D printer currently printing a 3D object;

generating a digital twin of the 3D printer based on the input, wherein the digital twin digitally represents one or more physical components of the 3D printer during printing of the 3D object;

analyzing the digital twin to identify a condition of at least one component of the one or more physical components of the 3D printer that can generate a defect in the 3D object being currently printed by the 3D printer; and determining, in real time, a corrective action to be performed in the 3D printing environment to correct the condition during a same print job in which the 3D object is being currently printed and before the 3D printer has finished printing the 3D object, wherein the corrective action comprises an action to correct the defect while a primary nozzle of the 3D printer continues to print the 3D object.

11. The system of claim 10, wherein generating the digital twin of the 3D printer is based on historically collected data from different types of parts and runtime problems experienced with the 3D printer.

12. The system of claim 10, wherein determining the corrective action to correct the condition is performed before the condition has caused a defect in the 3D object.

13. The system of claim 12, wherein the corrective action comprises at least one of:

changing an operational parameter of the at least one component of the one or more physical components of the 3D printer before the defect has occurred; or performing preventive maintenance on the at least one component of the one or more physical components of the 3D printer before the defect has occurred.

14. The system of claim 10, wherein determining the corrective action to correct the condition is performed after the condition has caused a defect in the 3D object.

15. The system of claim 14, wherein the corrective action comprises at least one of:

controlling a secondary print nozzle in the 3D printer to correct the defect in the 3D object being printed while the primary nozzle in the 3D printer continues to print the 3D object; or performing a surface abrasion on the 3D object to correct the defect while the primary nozzle in the 3D printer continues to print the 3D object.

16. A computer program product comprising a computer readable storage medium having computer readable program code embodied therewith, the computer-readable program code executable by one or more computer processors to perform operations comprising:

receiving input from a 3D printing environment comprising a 3D printer currently printing a 3D object;

generating a digital twin of the 3D printer based on the input, wherein the digital twin digitally represents one or more physical components of the 3D printer during printing of the 3D object;

analyzing the digital twin to identify a condition of at least one component of the one or more physical components of the 3D printer that can generate a defect in the 3D object being currently printed by the 3D printer; and determining, in real time, a corrective action to be performed in the 3D printing environment to correct the condition during a same print job in which the 3D object is being currently printed and before the 3D printer has finished printing the 3D object, wherein the corrective action comprises an action to correct the defect while a primary nozzle of the 3D printer continues to print the 3D object.

17. The computer program product of claim 16, wherein generating the digital twin of the 3D printer is based on historically collected data from different types of parts and runtime problems experienced with the 3D printer.

18. The computer program product of claim 16, wherein determining the corrective action to correct the condition is performed before the condition has caused a defect in the 3D object.

19. The computer program product of claim 18, wherein the corrective action comprises at least one of:

changing an operational parameter of the at least one component of the one or more physical components of the 3D printer before the defect has occurred; or performing preventive maintenance on the at least one component of the one or more physical components of the 3D printer before the defect has occurred.

20. The computer program product of claim 16, wherein determining the corrective action to correct the condition is performed after the condition has caused a defect in the 3D object being currently printed by the 3D printer.

* * * * *